US008677384B2

(12) United States Patent
Gray et al.

(10) Patent No.: US 8,677,384 B2
(45) Date of Patent: Mar. 18, 2014

(54) METHODS AND SYSTEMS FOR NETWORK BASED CAPTURE OF TELEVISION VIEWER GENERATED CLICKSTREAMS

(75) Inventors: James Harold Gray, Ellijay, GA (US); Thomas Jefferson Brothers, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1946 days.

(21) Appl. No.: 10/735,346

(22) Filed: Dec. 12, 2003

(65) Prior Publication Data
US 2005/0132419 A1 Jun. 16, 2005

(51) Int. Cl.
| H04H 60/33 | (2008.01) |
| H04H 60/45 | (2008.01) |
| H04N 5/445 | (2011.01) |
| G06F 3/00 | (2006.01) |
| G06F 13/00 | (2006.01) |

(52) U.S. Cl.
USPC ......... 725/9; 725/10; 725/11; 725/35; 725/46

(58) Field of Classification Search
None
See application file for complete search history.

(56) References Cited

U.S. PATENT DOCUMENTS

| 677,209 A | 6/1901 | Chernock et al. |
| 3,798,610 A | 3/1974 | Bliss et al. |
| 3,886,302 A | 5/1975 | Kosco |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |
| 4,697,209 A | 9/1987 | Kiewitt et al. |

(Continued)

FOREIGN PATENT DOCUMENTS

| EP | 0 424 648 | 2/1991 |
| EP | 0 424 648 A | 2/1991 |

(Continued)

OTHER PUBLICATIONS

U.S. Appl. No. 09/799,306, filed Jan. 6, 1997, Grauch.

(Continued)

*Primary Examiner* — Nasser Goodarzi
*Assistant Examiner* — Fred Peng
(74) *Attorney, Agent, or Firm* — Scott P. Zimmerman, PLLC (57) ABSTRACT

Methods and systems provide clickstream captures at a remote component, such as a video control system of a television network, by receiving user commands generated by the viewer that are sent to the remote component concurrently relative to when they are generated by the viewer. The commands are captured and then information related to these commands is stored remotely from the premises of the viewer. Additionally, the user commands may be executed remotely such as at a video control system of a television network or alternatively may be executed at the premises of the viewer such as within a set top box. Information related to these user commands continues to be stored remotely from the premises of the viewer after the user commands have been executed such that the information related to these user commands can be processed as necessary and used for various purposes.

23 Claims, 3 Drawing Sheets

(56) References Cited

U.S. PATENT DOCUMENTS

| | | |
|---|---|---|
| 4,698,670 A | 10/1987 | Matty |
| 4,720,873 A | 1/1988 | Goodman et al. |
| 4,816,904 A | 3/1989 | McKenna et al. |
| 4,885,632 A | 12/1989 | Mabey et al. |
| 4,890,322 A | 12/1989 | Russell, Jr. |
| 4,912,552 A | 3/1990 | Allison, III et al. |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | VonKohorn |
| 5,251,324 A | 10/1993 | McMullan, Jr. |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,382,970 A | 1/1995 | Kiefl |
| 5,389,964 A | 2/1995 | Oberle |
| 5,404,393 A | 4/1995 | Remillard |
| 5,410,326 A | 4/1995 | Goldstein |
| 5,410,344 A | 4/1995 | Graves |
| 5,436,653 A | 7/1995 | Ellis et al. |
| 5,440,334 A | 8/1995 | Walters et al. |
| 5,444,499 A | 8/1995 | Saitoh |
| 5,446,490 A | 8/1995 | Blahut et al. |
| 5,446,919 A | 8/1995 | Wilkins |
| 5,481,294 A | 1/1996 | Thomas et al. |
| 5,497,185 A | 3/1996 | Dufresne et al. |
| 5,500,681 A | 3/1996 | Jones |
| 5,504,519 A | 4/1996 | Remillard |
| 5,532,732 A | 7/1996 | Yuen et al. |
| 5,532,735 A | 7/1996 | Blahut et al. |
| 5,534,911 A | 7/1996 | Levitan |
| 5,537,143 A | 7/1996 | Steingold et al. |
| 5,559,548 A | 9/1996 | Davis et al. |
| 5,579,124 A | 11/1996 | Aijala et al. |
| 5,585,838 A | 12/1996 | Lawler et al. |
| 5,585,865 A | 12/1996 | Amano |
| 5,589,892 A | 12/1996 | Knee et al. |
| 5,596,994 A | 1/1997 | Bro |
| 5,600,364 A | 2/1997 | Hendricks |
| 5,600,366 A | 2/1997 | Schulman |
| 5,606,359 A | 2/1997 | Youden et al. |
| 5,606,602 A | 2/1997 | Johnson et al. |
| 5,608,448 A | 3/1997 | Smoral et al. |
| 5,619,247 A | 4/1997 | Russo |
| 5,630,119 A | 5/1997 | Aristides |
| 5,659,350 A | 8/1997 | Hendricks |
| 5,661,516 A | 8/1997 | Carles |
| 5,710,815 A | 1/1998 | Ming et al. |
| 5,721,827 A | 2/1998 | Logan et al. |
| 5,724,521 A | 3/1998 | Dedrick |
| 5,724,525 A | 3/1998 | Beyers, II et al. |
| 5,724,607 A | 3/1998 | Brandt |
| 5,740,549 A | 4/1998 | Reilly et al. |
| 5,752,159 A | 5/1998 | Faust et al. |
| 5,754,393 A | 5/1998 | Herz |
| 5,754,775 A | 5/1998 | Adamson et al. |
| 5,754,939 A | 5/1998 | Herz |
| 5,758,257 A | 5/1998 | Herz |
| 5,758,259 A | 5/1998 | Lawler |
| 5,774,170 A | 6/1998 | Hite et al. |
| 5,778,182 A | 7/1998 | Cathey et al. |
| 5,794,210 A | 8/1998 | Goldhaber et al. |
| 5,796,952 A | 8/1998 | Davis et al. |
| 5,798,785 A | 8/1998 | Hendricks et al. |
| 5,809,481 A | 9/1998 | Baron et al. |
| 5,818,438 A | 10/1998 | Howe |
| 5,838,314 A | 11/1998 | Neel |
| 5,848,396 A | 12/1998 | Gerace |
| 5,848,397 A | 12/1998 | Marsh et al. |
| 5,850,249 A | 12/1998 | Massetti et al. |
| 5,850,447 A | 12/1998 | Peyret |
| 5,854,897 A | 12/1998 | Radziewicz et al. |
| 5,861,906 A | 1/1999 | Dunn |
| 5,867,226 A | 2/1999 | Wehmeyer et al. |
| 5,872,588 A | 2/1999 | Aras et al. |
| 5,872,834 A | 2/1999 | Teitelbaum et al. |
| 5,883,942 A | 3/1999 | Lim et al. |
| 5,892,508 A | 4/1999 | Howe |
| 5,892,536 A | 4/1999 | Logan |
| 5,901,209 A | 5/1999 | Tannhenbaum et al. |
| 5,917,481 A | 6/1999 | Rzeszewski |
| 5,931,908 A | 8/1999 | Gerba et al. |
| 5,945,988 A | 8/1999 | Williams et al. |
| 5,946,636 A | 8/1999 | Uyeno et al. |
| 5,948,061 A | 9/1999 | Merriman et al. |
| 5,973,683 A | 10/1999 | Cragun |
| 5,983,227 A | 11/1999 | Nazem |
| 5,991,735 A | 11/1999 | Gerace |
| 5,991,799 A | 11/1999 | Yen et al. |
| 6,002,393 A | 12/1999 | Hite |
| 6,005,597 A | 12/1999 | Barrett |
| 6,026,368 A | 2/2000 | Brown et al. |
| 6,029,045 A | 2/2000 | Picco et al. |
| 6,029,195 A | 2/2000 | Herz |
| 6,076,094 A | 6/2000 | Cohen |
| 6,081,840 A | 6/2000 | Zhao |
| 6,100,916 A | 8/2000 | August |
| 6,119,098 A | 9/2000 | Guyot et al. |
| 6,128,009 A | 10/2000 | Ohkura et al. |
| 6,134,531 A | 10/2000 | Trewitt et al. |
| 6,134,532 A | 10/2000 | Lazarus |
| 6,160,570 A | 12/2000 | Sitnik |
| 6,163,644 A | 12/2000 | Owashi et al. |
| 6,172,674 B1 | 1/2001 | Etheridge |
| 6,177,931 B1 | 1/2001 | Alexander et al. |
| D437,879 S | 2/2001 | Weinandt |
| 6,185,614 B1 | 2/2001 | Cuomo |
| 6,199,076 B1 | 3/2001 | Logan et al. |
| 6,202,210 B1 | 3/2001 | Ludtke |
| 6,226,618 B1 | 5/2001 | Downs et al. |
| 6,235,975 B1 | 5/2001 | Boe et al. |
| 6,252,586 B1 | 6/2001 | Freeman et al. |
| 6,253,189 B1 | 6/2001 | Feezell et al. |
| 6,279,157 B1 | 8/2001 | Takasu |
| 6,282,713 B1 | 8/2001 | Kitsukawa |
| 6,286,042 B1 | 9/2001 | Hasselberg et al. |
| 6,292,549 B1 | 9/2001 | Lung et al. |
| 6,304,644 B2 | 10/2001 | Karnowski |
| 6,310,943 B1 | 10/2001 | Kowlaski |
| 6,314,568 B1 | 11/2001 | Ochiai |
| 6,314,577 B1 | 11/2001 | Pocock |
| 6,317,488 B1 | 11/2001 | DePond et al. |
| 6,324,271 B1 | 11/2001 | Sawyer et al. |
| 6,327,574 B1 | 12/2001 | Kramer et al. |
| 6,332,021 B2 | 12/2001 | Latter et al. |
| 6,338,043 B1 | 1/2002 | Miller |
| 6,339,639 B1 | 1/2002 | Henderson |
| 6,341,161 B1 | 1/2002 | Latter et al. |
| 6,345,187 B1 | 2/2002 | Berthoud et al. |
| 6,345,256 B1 | 2/2002 | Milsted et al. |
| 6,351,637 B1 | 2/2002 | Lee |
| 6,353,929 B1 | 3/2002 | Houston |
| 6,366,772 B1 | 4/2002 | Arnson |
| 6,397,057 B1 | 5/2002 | Malackowski et al. |
| 6,400,408 B1 | 6/2002 | Berger |
| 6,408,437 B1 | 6/2002 | Hendricks et al. |
| 6,427,003 B1 | 7/2002 | Corbett |
| 6,434,747 B1 | 8/2002 | Khoo et al. |
| 6,438,216 B1 | 8/2002 | Aktas |
| 6,442,262 B1 | 8/2002 | Moss et al. |
| 6,442,263 B1 | 8/2002 | Beaton et al. |
| 6,445,781 B1 | 9/2002 | Heinmiller et al. |
| 6,446,261 B1 | 9/2002 | Rosser |
| 6,457,010 B1 | 9/2002 | Eldering |
| 6,463,468 B1 | 10/2002 | Buch |

(56) References Cited

U.S. PATENT DOCUMENTS

| | | | |
|---|---|---|---|
| 6,463,585 B1 | 10/2002 | Hendricks et al. |
| 6,477,704 B1 | 11/2002 | Cremia |
| 6,480,589 B1 | 11/2002 | Lee et al. |
| 6,487,538 B1 | 11/2002 | Gupta et al. |
| 6,493,439 B2 | 12/2002 | Lung et al. |
| 6,496,569 B2 | 12/2002 | Pelletier et al. |
| 6,496,571 B1 | 12/2002 | Wilson |
| 6,496,818 B1 | 12/2002 | Ponte |
| 6,498,841 B2 | 12/2002 | Bull et al. |
| 6,505,348 B1 | 1/2003 | Knowles |
| 6,507,839 B1 | 1/2003 | Ponte |
| 6,510,417 B1 | 1/2003 | Woods |
| 6,529,591 B1 | 3/2003 | Dosani et al. |
| 6,530,082 B1 | 3/2003 | DelSesto et al. |
| 6,542,583 B1 | 4/2003 | Taylor |
| 6,542,591 B1 | 4/2003 | Amro et al. |
| 6,546,092 B2 | 4/2003 | Corbett et al. |
| 6,553,110 B1 | 4/2003 | Peng |
| 6,553,178 B2 | 4/2003 | Abecassis |
| 6,560,317 B1 | 5/2003 | Quagliana |
| 6,560,327 B1 | 5/2003 | McConnell |
| 6,570,971 B2 | 5/2003 | Latter et al. |
| 6,571,344 B1 | 5/2003 | Sitnik |
| 6,574,319 B2 | 6/2003 | Latter et al. |
| 6,584,490 B1 | 6/2003 | Schuster et al. |
| 6,631,181 B1 | 10/2003 | Bates et al. |
| 6,631,360 B1 | 10/2003 | Cook |
| 6,639,979 B1 | 10/2003 | Kim |
| 6,647,548 B1 | 11/2003 | Lu et al. |
| 6,650,743 B2 | 11/2003 | Heinmiller et al. |
| 6,675,383 B1 | 1/2004 | Wheeler et al. |
| 6,698,020 B1 | 2/2004 | Zigmond et al. |
| 6,714,992 B1 | 3/2004 | Kanojia et al. |
| 6,718,021 B2 | 4/2004 | Crockett et al. |
| 6,718,551 B1 | 4/2004 | Swix et al. |
| 6,728,355 B2 | 4/2004 | Kowalski |
| 6,731,727 B2 | 5/2004 | Corbett et al. |
| 6,738,978 B1 | 5/2004 | Hendricks et al. |
| 6,748,058 B1 | 6/2004 | Schwend et al. |
| 6,748,068 B1 | 6/2004 | Walsh et al. |
| 6,757,691 B1 | 6/2004 | Welsh et al. |
| 6,766,003 B2 | 7/2004 | Moss et al. |
| 6,766,524 B1 | 7/2004 | Matheny et al. |
| D494,953 S | 8/2004 | Leung |
| 6,771,754 B2 | 8/2004 | Pelletier et al. |
| 6,771,755 B1 | 8/2004 | Simpson |
| 6,772,209 B1 | 8/2004 | Chernock |
| 6,785,301 B1 | 8/2004 | Chapman et al. |
| 6,785,368 B1 | 8/2004 | Eason et al. |
| 6,798,879 B1 | 9/2004 | Beham |
| 6,807,267 B2 | 10/2004 | Moss et al. |
| 6,810,115 B2 | 10/2004 | Fukuda |
| 6,810,527 B1 | 10/2004 | Conrad et al. |
| 6,816,481 B1 | 11/2004 | Adams et al. |
| 6,826,271 B1 | 11/2004 | Kanabar et al. |
| 6,831,974 B1 | 12/2004 | Watson et al. |
| 6,845,151 B2 | 1/2005 | Peng |
| 6,845,398 B1 | 1/2005 | Kanojia et al. |
| 6,850,988 B1 | 2/2005 | Reed |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch et al. |
| 6,985,882 B1 | 1/2006 | Del Sesto |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,100,183 B2 | 8/2006 | Kunkel et al. |
| 7,212,979 B1 * | 5/2007 | Matz et al. ............ 705/1 |
| 7,260,823 B2 | 8/2007 | Schlack et al. |
| 7,269,835 B2 | 9/2007 | Swix |
| 7,343,354 B2 | 3/2008 | Hennessey |
| 7,441,260 B1 | 10/2008 | Kurapati |
| 7,444,658 B1 | 10/2008 | Matz |
| 7,587,323 B2 | 9/2009 | Matz |
| 7,587,732 B2 | 9/2009 | Wright et al. |
| 7,593,858 B2 | 9/2009 | Matz |
| 7,617,508 B2 | 11/2009 | Gray |
| 7,661,118 B2 | 2/2010 | Matz |
| 2001/0004733 A1 | 6/2001 | Eldering |
| 2002/0004382 A1 | 1/2002 | Cox et al. |
| 2002/0009184 A1 | 1/2002 | Shnier |
| 2002/0013757 A1 | 1/2002 | Bykowsky |
| 2002/0016748 A1 | 2/2002 | Emodi et al. |
| 2002/0016964 A1 | 2/2002 | Aratani et al. |
| 2002/0032906 A1 | 3/2002 | Grossman |
| 2002/0035600 A1 | 3/2002 | Ullman et al. |
| 2002/0046099 A1 | 4/2002 | Frengut et al. |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 | 5/2002 | Hunter et al. |
| 2002/0078443 A1 | 6/2002 | Gadkari et al. |
| 2002/0083441 A1 | 6/2002 | Flickinger et al. |
| 2002/0087573 A1 | 7/2002 | Reuning et al. |
| 2002/0090933 A1 | 7/2002 | Rouse et al. |
| 2002/0092017 A1 | 7/2002 | Klosterman et al. |
| 2002/0100064 A1 * | 7/2002 | Ward et al. ............ 725/144 |
| 2002/0122401 A1 | 9/2002 | Xiang et al. |
| 2002/0123928 A1 | 9/2002 | Eldering et al. |
| 2002/0133817 A1 | 9/2002 | Markel |
| 2002/0143647 A1 | 10/2002 | Headings et al. |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0183098 A1 | 12/2002 | Lee et al. |
| 2002/0191755 A1 | 12/2002 | Lew et al. |
| 2002/0199197 A1 | 12/2002 | Winter |
| 2003/0003990 A1 | 1/2003 | Von Kohorn |
| 2003/0028432 A1 | 2/2003 | Troyansky et al. |
| 2003/0028873 A1 | 2/2003 | Lemmons |
| 2003/0050100 A1 | 3/2003 | Dent |
| 2003/0067554 A1 | 4/2003 | Klarfield |
| 2003/0092384 A1 | 5/2003 | Ross, III |
| 2003/0093792 A1 | 5/2003 | Labeeb et al. |
| 2003/0095650 A1 | 5/2003 | Mize |
| 2003/0108184 A1 | 6/2003 | Brown et al. |
| 2003/0110489 A1 | 6/2003 | Gudorf et al. |
| 2003/0110497 A1 | 6/2003 | Yassin et al. |
| 2003/0115597 A1 | 6/2003 | Yassin et al. |
| 2003/0148758 A1 | 8/2003 | McMullin |
| 2003/0149975 A1 | 8/2003 | Eldering et al. |
| 2003/0172374 A1 | 9/2003 | Vinson et al. |
| 2004/0125929 A1 | 7/2004 | Pope |
| 2004/0128682 A1 | 7/2004 | Liga et al. |
| 2004/0133467 A1 | 7/2004 | Siler |
| 2004/0163101 A1 | 8/2004 | Swix |
| 2004/0193483 A1 | 9/2004 | Wolan |
| 2004/0194131 A1 | 9/2004 | Ellis et al. |
| 2004/0248560 A1 | 12/2004 | Bedingfield et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0084084 A1 | 4/2005 | Cook et al. |
| 2005/0132419 A1 | 6/2005 | Gray |
| 2005/0137958 A1 | 6/2005 | Huber et al. |
| 2005/0235318 A1 | 10/2005 | Grauch |
| 2005/0251820 A1 | 11/2005 | Stefanik |
| 2005/0278741 A1 | 12/2005 | Robarts et al. |
| 2005/0283401 A1 | 12/2005 | Swix |
| 2005/0283792 A1 | 12/2005 | Swix |
| 2006/0031882 A1 | 2/2006 | Swix |
| 2006/0075456 A1 | 4/2006 | Gray |
| 2006/0106710 A1 | 5/2006 | Meek et al. |
| 2006/0161952 A1 | 7/2006 | Herz et al. |
| 2006/0253884 A1 | 11/2006 | Gray |
| 2006/0271438 A1 | 11/2006 | Shotland et al. |
| 2006/0271552 A1 | 11/2006 | McChesney et al. |
| 2006/0288367 A1 | 12/2006 | Swix |
| 2007/0038514 A1 | 2/2007 | Patterson et al. |

(56) References Cited

U.S. PATENT DOCUMENTS

| | | | |
|---|---|---|---|
| 2007/0083885 A1 | 4/2007 | Harding |
| 2007/0226761 A1 | 9/2007 | Zalewski et al. |
| 2007/0250846 A1 | 10/2007 | Swix |
| 2007/0255622 A1 | 11/2007 | Swix |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0167943 A1 | 7/2008 | O'Neil |
| 2008/0263586 A1 | 10/2008 | Thomas |
| 2009/0292703 A1 | 11/2009 | Matz |
| 2010/0083298 A1 | 4/2010 | Swix |
| 2010/0100435 A1 | 4/2010 | Matz |
| 2010/0191601 A1 | 7/2010 | Matz |
| 2010/0257037 A1 | 10/2010 | Matz |

FOREIGN PATENT DOCUMENTS

| | | |
|---|---|---|
| EP | 1162840 A2 | 12/2001 |
| WO | WO 9222983 | 12/1992 |
| WO | WO 94 17609 | 8/1994 |
| WO | WO 96 07270 | 3/1996 |
| WO | WO 9831114 | 7/1998 |
| WO | WO 99 04561 | 1/1999 |
| WO | WO 99 04561 A | 1/1999 |
| WO | WO 99 45702 A | 9/1999 |
| WO | WO 99 45702 | 10/1999 |
| WO | WO 99 52285 | 10/1999 |
| WO | WO 99 52285 A | 10/1999 |
| WO | WO 0147156 | 6/2001 |

OTHER PUBLICATIONS

U.S. Appl. No. 10/016,988, filed Dec. 14, 2001, Matz.
U.S. Appl. No. 10/017,111, filed Dec. 14, 2001, Matz.
U.S. Appl. No. 10/017,630, filed Dec. 14, 2001, Swix.
U.S. Appl. No. 10/017,640, filed Dec. 14, 2001, Matz.
U.S. Appl. No. 10/017,742, filed Dec. 14, 2001, Matz.
U.S. Appl. No. 10/036,677, filed Dec. 21, 2001, Swix.
U.S. Appl. No. 10/735,309, filed Dec. 12, 2003, Gray.
U.S. Appl. No. 10/037,005, filed Dec. 21, 2001, Matz.
U.S. Appl. No. 10/778,345, filed Feb. 17, 2004, Swix.
U.S. Appl. No. 10/735,346, filed Dec. 12, 2003, Gray.
U.S. Appl. No. 10/036,923, filed Dec. 21, 2001, Matz.
PCT Publication No. WO 94/17609 (Kiefl et al., Aug. 4, 1994).
Cauley, Leslie, "Microsoft, Baby Bell Form Video Alliance," *The Wall Street Journal*, Sep. 26, 1994.
"allNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect_suite.html, (Nov. 16, 2001) pp. 1-2.
"Liberate Technologies—Solutions," Liberate imprint Server™, www.solutions.liberate.com/products/imprint_server.html, (Nov. 16, 2001) p. 1 of 1.
"Liberate Technologies—Solutions," Liberate Mediacast Server™, www.solutions.liberate.com/products/mediacast_server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"Power, flexibility, and control," RespondTV, www.respondtv.com/whyrespond.html (Nov. 16, 2001) pp. 1-2.
"It just clicks!," RespondTV, www.respondtv.com/inaction.html, (Nov. 16, 2001) pp. 1-2.
"The Wink System," Wink System Diagram, www.wink.com/contents/tech_diagram.html, (Nov. 16, 2001) p. 1 of 1.
"What is Wink?," www.wink.com/contents/whatiswink.html, (Nov. 16, 2001) p. 1 of 1.
"How Wink Works," What is Wink: How wink works, www.wink.com/contents/howitworks.html, (Nov. 16, 2001) p. 1 of 1.
"What is Wink: Examples," What is Wink—Examples, www.wink.com/contents/examples.html, (Nov. 16, 2001) pp. 1-2.
"Nielsen Media Research—Who We Are & What We Do," www.nielsenmedia.com/whoweare.html, (Oct. 11, 2001) pp. 1-4.
www.actv.com, Screen Print, Oct. 8, 2000.
"ACTV, Inc. Offers Exclusive Preview of 'Individualized Television' at Official All-Star Café," Business Wire, Sep. 16, 1998.
"ACTV's HyperTV & 'Individualized Television' to be Powered by Sun Microsystems' JavaTV Technology," Business Wire, Apr. 21, 1999.
Whitaker, Jerry, "Interactive TV: Killer Ap or Technical Curiosity?", Broadcast Engineering, Dec. 1999.
Dickson, Glen, "Digital TV gets specifically directed," Broadcasting & Cable, Jun. 5, 2000.
Reed, David, "The future is digital," Precision Marketing, v. 13, n.51, p. 27, Sep. 21, 2001.
Aggarwal et al ("A Framework for the Optimizing of WWW Advertising" Proceedings fo the International IFIP/GI Working Conference Trends in Distributed Systems for Electronic Commerce, pp. 1-10, Year of Publication: 1998).
Ehrmantraut et al., "The Personal Electronic Program Guide—Towards the Pre-selection of Individual TV Programs", pp. 1-8, 1996.
Wasserman, Todd, "Mining Everyone's Business." Brandweek, Feb. 28, 2000. 19 pages.
U.S. Appl. No. 08/779,306, Grauch.
U.S. Appl. No. 10/017,742, Matz.
U.S. Appl. No. 10/039,062, Matz.
U.S. Appl. No. 10/020,779, Swix.

\* cited by examiner

METHODS AND SYSTEMS FOR NETWORK BASED CAPTURE OF TELEVISION VIEWER GENERATED CLICKSTREAMS

CROSS-REFERENCE TO RELATED APPLICATIONS

The present application is related to and incorporates by reference in the entirety the following applications: U.S. application Ser. No. 10/735,309 filed on Dec. 12, 2003 and entitled METHODS AND SYSTEMS FOR NETWORK BASED CAPTURE OF TELEVISION VIEWER GENERATED CLICKSTREAMS and now issued as U.S. Pat. No. 7,617,508; U.S. application Ser. No. 08/779,306 filed on Jan. 6, 1997 and entitled METHOD AND SYSTEM FOR TRACKING NETWORK USE (now abandoned); U.S. application Ser. No. 09/496,825 filed on Feb. 1, 2000 and entitled METHOD AND SYSTEM FOR TRACKING NETWORK USE and now issued as U.S. Pat. No. 6,983,478; U.S. application Ser. No. 10/017,742 filed on Dec. 14, 2001 and entitled SYSTEM AND METHOD FOR UTILIZING TELEVISION VIEWING PATTERNS; U.S. application Ser. No. 10/017,640 filed on Dec. 14, 2001 and entitled SYSTEM AND METHOD FOR IDENTIFYING DESIREABLE SUBSCRIBERS and now issued as U.S. Pat. 7,212,979; U.S. application Ser. No. 10/016,988 filed on Dec. 14, 2001 and entitled METHOD AND SYSTEM TO PERFORM CONTENT TARGETING and now issued as U.S. Pat. No. 7,444,658; U.S. application Ser. No. 10/017,111 filed on Dec. 14, 2001 and entitled METHOD AND SYSTEM FOR TARGETED INCENTIVES; U.S. application Ser. No. 10/017,630 filed on Dec. 14, 2001 and entitled SYSTEM AND METHOD FOR DEVELOPING TAILORED TELEVISION CONTENT RELATED PACKAGES and now issued as U.S. Pat. No. 7,587,323; U.S. application Ser. No. 10/036,677 filed on Dec. 21, 2001 and entitled METHOD AND SYSTEM FOR MANAGING TIMED RESPONSES TO A/V EVENTS IN TELEVISION and now issued as U.S. Pat. No. 7,086,075; U.S. application Ser. No. 10/036,923 filed on Dec. 21, 2001 and entitled SYSTEM AND METHOD FOR CUSTOMIZING CONTENT-ACCESS LISTS and now issued as U.S. Pat. No. 7,020,652; and U.S. application Ser. No. 10/037,005 filed on Dec. 21, 2001 and entitled SYSTEM AND METHOD FOR STORING AND DISTRIBUTING TELEVISION VIEWING PATTERNS (now abandoned).

TECHNICAL FIELD

The present invention is related to the capture of clickstreams generated by television viewers when making television programming selections. More particularly, the present invention is related to the network based capture of these clickstreams.

BACKGROUND

When a television viewer watches television, the viewer periodically makes selections to control what is being viewed. The viewer may change to a different channel and program, may choose to channel surf during commercials, may choose to shut down the television equipment and not watch any programming during certain time periods, etc. The sequence of these user commands are known as a clickstream which provides an indication of what the viewer is or is not watching on television when the clickstream is captured in relation to time, current channel before a change, current channel after a change, etc.

Initially, this clickstream was not captured in any way. The behavior of the television viewer was not tracked, and there was no way to identify trends in the behavior of the television viewer without requiring the television viewer to become involved, such as manually recording what the viewer watches or installing special equipment in the home of the viewer specifically for the purpose of tracking what programs the viewer watched.

The introduction of set top boxes that tune in broadcasted channels for the viewer gave rise to a way to track the television watching behavior of the viewer without requiring the viewer to become involved. The set top box receives multiple streams of television programming and executes the commands from the viewer such as channel changes to control which stream is being viewed by the viewer. The set top box may also be provided with clickstream capture functionality so that when the set top box receives a user command, the command is captured and stored within the set top box in addition to being executed within the set top box. In this way, the set top box effectively captures the viewing behaviors of the viewer.

The clickstream that has been captured may then be periodically forwarded from the set top box to a service provider system where it can be put to use. The service provider system may process the clickstream relative to profile information of the viewers producing the clickstreams to produce statistics about television viewing habits, such as statistics based on demographics. The service provider and/or television content providers may then utilize these statistics for various purposes. For instance, this information may be used to determine what television programming to provide to consumers.

While this set top box approach does provide the clickstream capture, it has drawbacks because it requires the set top box of every viewer being tracked to have the ability to record and periodically forward the clickstream information. Additionally, for advanced television networks, the switching between streams of programming may be performed within the television network for a viewer rather than at the set top box such that the set top box only receives a single stream at a time. Thus, the set top box may not include the intelligence to recognize the significance of one user command from another but instead simply transfers the user command to the television network for execution such that the set top box is ineffective at capturing the clickstream.

SUMMARY

Embodiments of the present invention address these issues and others by providing network based clickstream capture. The user commands are transferred from the premises of the viewer, such as by a set top box, to a remotely located component such as a video control system within a television network. The user commands are captured at the remotely located component and are stored remotely from the premises of the viewer. Accordingly, the set top box need not necessarily have clickstream capture capabilities.

One embodiment is a method of capturing user commands related to viewing television programming. The method involves receiving a user command at a viewer appliance at a premises of the viewer. Relative to receiving the user command, the user command is concurrently forwarded from the viewer appliance to a component located remotely from the premises of the viewer. Remotely from the premises of the viewer, information related to the user command is stored upon receiving the user command at the component.

Another embodiment is a method of capturing user commands related to viewing television programming. The method involves receiving a user command at a viewer appliance at a premises of the viewer. Relative to receiving the user command, the user command is concurrently forwarded from the viewer appliance to a component located remotely from the premises of the viewer. The user command is executed at the component to alter an aspect of the television programming being viewed by the viewer. Remotely from the premises of the viewer, information related to the user command continues to be stored after the user command has been executed at the component.

Another embodiment is a system for capturing user commands related to viewing television programming. The system includes a reception mechanism located at a premises of a viewer that receives user commands. A transfer mechanism is located at the premises of the viewer and transfers the user commands concurrently relative to the reception mechanism receiving the user commands. A control mechanism executes the user commands received by the reception mechanism to control an aspect of the television programming being provided to the viewer. A capture mechanism is located remotely from the premises of the viewer and receives the user commands being transferred concurrently by the transfer mechanism. A storage mechanism is located remotely from the premises of the viewer and continues to store information related to the user commands after the user commands have been executed by the control mechanism and received by the capture mechanism.

Another embodiment is a method of capturing user commands from a viewer that are related to viewing television programming. The method involves capturing the user command remotely from the premises of the viewer and continuing to store information related to the user command after the user command has been executed.

Another embodiment is a method of capturing user commands from a viewer that are related to viewing television programming. The method involves receiving the user command at a viewer appliance at the premises of the viewer. The method further involves executing the user command at the viewer appliance and forwarding the user command from the viewer appliance.

DETAILED DESCRIPTION

Embodiments of the present invention provide for the network capture of clickstreams that are generated by TV viewers. Thus, the network capture obtains the clickstreams without requiring the viewer appliance to capture the clickstreams and store the clickstreams for a period of time, and then forward the stored clickstreams on to a downstream location. Instead, the viewer appliance receiving the clickstreams from the viewer forwards the user commands of the clickstream up to the network location as the user commands are being received. This enables the network to have almost immediate access to all user commands of a clickstream which can then be processed as necessary to produce statistics about the behavior of the TV viewers.

Figure 1:
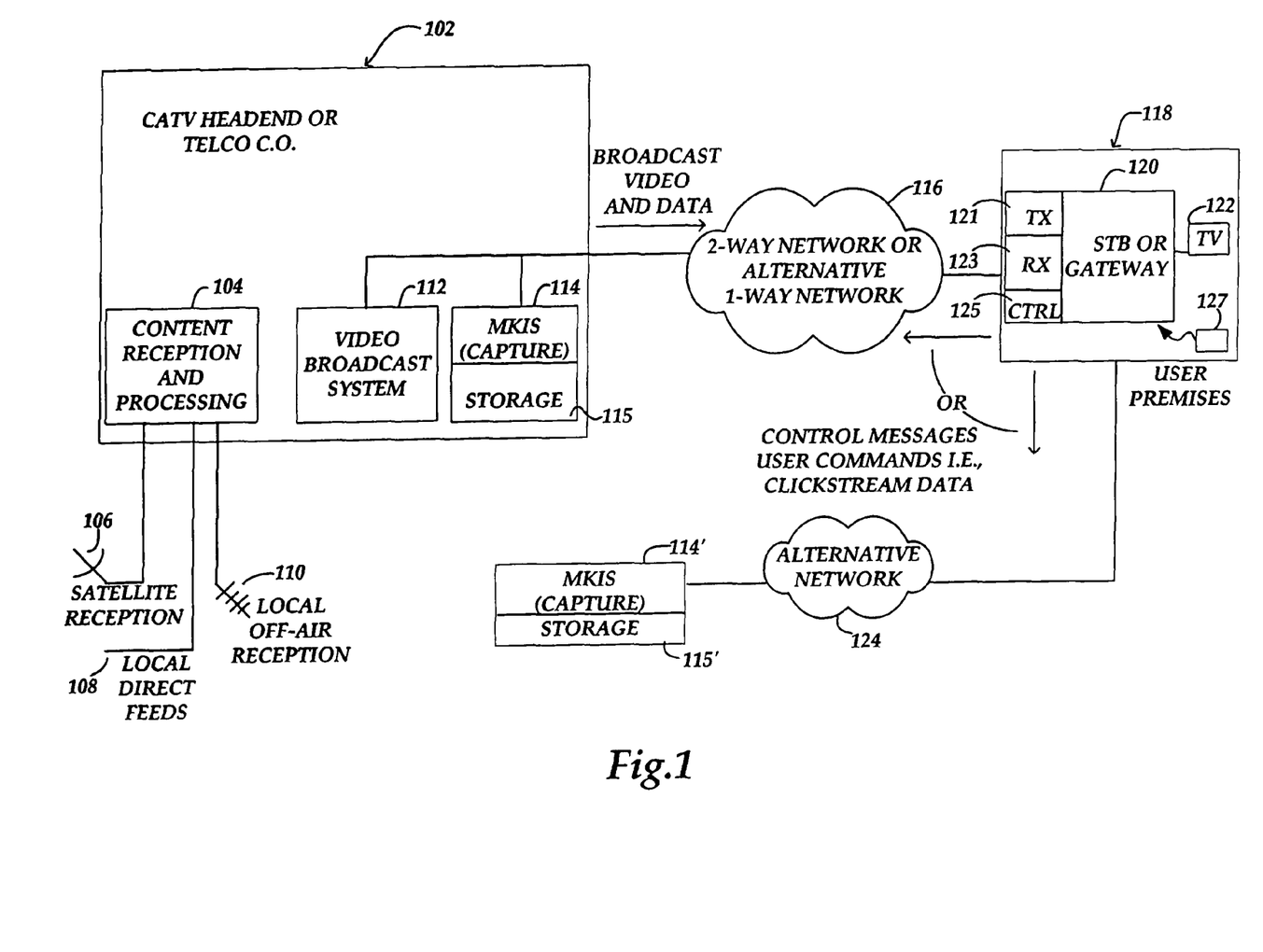
FIG. 1 shows an illustrative clickstream capture system architecture for implementing embodiments of the present invention where the television programming is broadcast to a viewer appliance that executes the user commands while the clickstream capture is performed remotely from the viewer premises.

FIG. 1 shows one example of a system for capturing the clickstreams where the television programming being provided to the viewer is through broadcast system. Multiple channels of television programming are being broadcast simultaneously to the viewer appliance 120 such as a set top box or broadband gateway, which then tunes to the particular channel of programming that the viewer desires to watch. The broadcast television programming is provided to viewers from a central location 102, such as a community access television ("CATV") headend or a telephone company ("telco") central office ("CO") which may provide Internet connectivity for streaming programming to the viewer.

The central location 102 includes various components for receiving the television programming to be broadcast to the television viewers. Much of the television programming originates from satellite reception via a satellite receiver dish 106. Additional direct local feeds 108 receive direct transmission via a wireline link to local television stations. Also, additional local off-air reception via antennas 110 may also receive local programming that is not otherwise received through the direct local feeds 108.

These programming sources provide received programming to a content reception and processing system 104. This system 104 takes the various channels of television programming being received and creates a channel line-up. The channel line-up is the distribution of the channels being provided by the service provider over the particular channels designated by the service provider. The content reception and processing system 104 receives a particular stream of programming and assigns it to a particular channel within the channel line-up.

The content reception and processing system 104 provides the individual streams of programming to a video broadcast system 112. The video broadcast system 112 then broadcasts each of the streams of programming within its assigned channel of the channel line-up. The video broadcast system 112 broadcasts these channels, as well as data such as guide data, over a distribution network 116 that feeds each of a plurality of individual television viewer premises 118. Typically, the distribution network 116 includes a network of coaxial lines, twisted pair lines, or wireless links that extend over a region being served, where each of the lines terminates at viewer premises 118.

The broadcasts may be either in an analog or a digital format. The network 116 may carry either format or both formats, such as where one set of channels of the channel line-up are broadcast as analog while another set of channels of the channel line-up are digital. Additionally, the network 116 may carry two-way communications such that communications may be provided back to the central location 102 from viewer premises 118. Alternatively, the network 116 may carry only one-way communications from the central location 102 to viewer premises 118.

At viewer premises 118, the incoming stream of channels is provided to a viewer appliance 120. A viewer appliance 120 allows a viewer to provide commands to control aspects of the television programming being viewed, such as channel changes and/or additional aspects such as audio format and volume control. The viewer appliance 120 typically outputs the selected channel to a television 122. A viewer appliance 120 such as a broadband gateway may be present in place of a set top box so as to receive user commands from different areas of the premises 118 and distribute the selected channel to televisions located in different areas as opposed to having a viewer appliance at each location where a television is present. It should be appreciated that the viewer appliance 120 may be incorporated into the television 122 rather than being a separate component.

When a viewer is watching television, the viewer provides user commands to control the aspects of television programming as desired. The viewer may provide a user command by pressing buttons on a remote control 127 that provides a corresponding signal to the viewer appliance 120 and are received by a reception module 123. Alternatively, the viewer may provide a user command by pressing buttons located on the viewer appliance 120 itself. The viewer appliance 120 of this example then performs at least two actions. The viewer appliance 120 executes the command through a control module 125 to control the television programming as desired by the viewer. In addition to executing the command, as the command is received the viewer appliance 120 forwards the user command (i.e., a control message) to an external location rather than merely storing a record of it for future transfer by sending the user command from a transmission module 121.

The viewer appliance 120 may forward the user command to an external location in various ways. For example, where the distribution network 116 is a two-way network, the user command may be transferred over the network 116 back to the central location 102. The destination for the user command in this example is a marketing information system ("MKIS") 114. The MKIS 114 is interfaced to the two-way network 116 such that user commands are directed to the MKIS 114 where they are captured from the transmission and stored in storage 115 of the MKIS 114.

Typically, the user commands coming from a particular viewer premises 118 are stored in association with an identifier of the viewer such that the MKIS 114 matches the user command to a profile for the viewer, such as the demographical categories of the viewer. Also, the context in which the user command is received is known due to the MKIS 114 storing a time stamp for when the user command is received and also having stored the preceding user commands. Accordingly, downstream processing can determine behaviors of TV viewers relative to the content being provided based on knowing when a user command or stream of user commands (i.e., a clickstream) is received relative to what content is being shown on a particular channel at that particular time. Thus, it can be determined that a television viewer switches from one program to another, switches the channel during commercials, mutes the television when certain content is present, etc. Furthermore, these behaviors can be matched statistically with the various demographic categories known for the viewers.

Rather than forwarding the user commands back to the central location 102 through the distribution network 116, the viewer appliance 120 may be provided with an alternative route to forward the user commands. For example, the distribution network 116 may only be a one-way network or the destination for the user commands may be other than the central location 102. Thus, the viewer appliance 120 may be provided with a connection to an alternative data network 124 which interconnects an MKIS 114' having storage 115' to the viewer appliance 120. For example, the viewer appliance 120 may be connected to a digital subscriber line ("DSL") or other broadband connection to network 124, through the public switched telephone network ("PSTN"), through a wireless connection, etc. Thus, when the viewer appliance 120 receives the user command, it is forwarded through the alternative network 124 to the MKIS 114' where it is captured from the stream of communication and is stored in storage 115' as described above.

Figure 2:
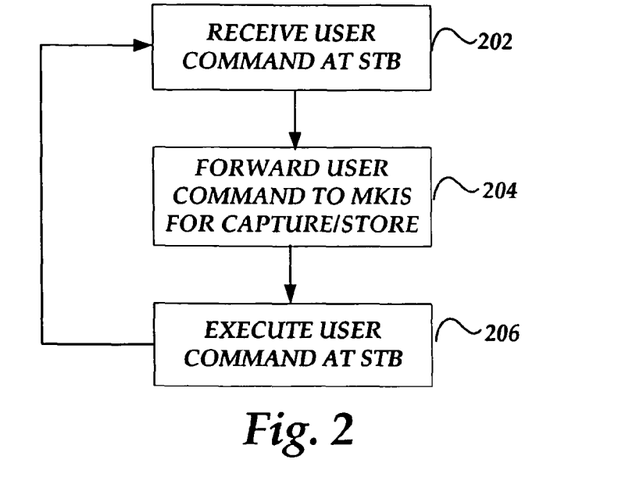
FIG. 2 shows an illustrative set of logical operations within the system of FIG. 1 for implementing embodiments of the present invention.

FIG. 2 shows the logical operations performed within the system of FIG. 1 to capture the user commands at a location remote from viewer premises 118, such as at the MKIS 114. Initially, the user command is received at the viewer appliance 120 at reception operation 202. As described above, this may be from the viewer entering a command through a remote control 127 or by entering the command directly on the viewer appliance 120 where the command is received by a reception module 123.

Upon receiving the user command, the viewer appliance 120 forwards the user command to the MKIS 114 where it is captured and stored as appropriate for future processing at forward operation 204. Also upon receiving the user command, the viewer appliance 120 executes the user command to alter the aspects of the television programming at execution operation 206. While forward operation 204 and execution operation 206 are shown to occur in series, it will be appreciated that the viewer appliance 120 may perform these two operations in parallel such that there is no perceived delay by the viewer in entering the command and seeing the result of its execution.

Figure 3:
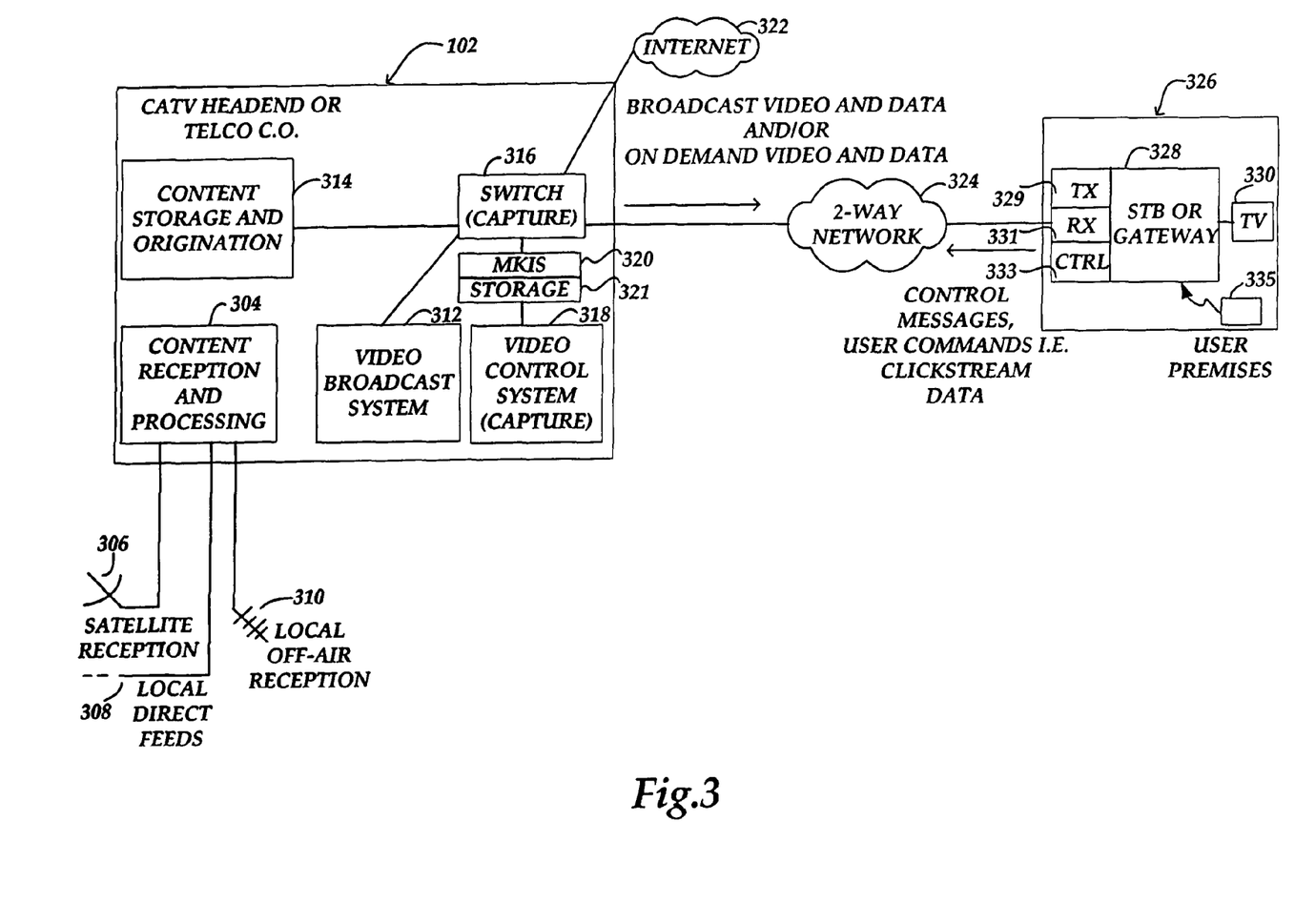
FIG. 3 shows an illustrative clickstream capture system architecture for implementing embodiments of the present invention where at least a portion of the television programming is switched within the television network such that the television network executes user commands while the clickstream capture is performed remotely from the viewer premises.

FIG. 3 shows another example of a system for capturing the clickstreams, but in this example the television programming that is being provided to the viewer includes at least video-on-demand. In the video-on-demand system, the streams of programming to be sent to the viewer are switched within the television network of the central location 302 such that only one of the streams is being sent through a network 324 to a viewer appliance 328. The system of FIG. 3 may also but not necessarily include broadcasted programming where multiple streams are being provided to and selected by the viewer appliance 328 as discussed above in relation to FIG. 1. The video-on-demand and broadcast television programming is provided to viewers from a central location 302.

The central location 302 of this example includes various components for receiving the television programming to be provided to the television viewers. Again, much of the television programming originates from a satellite reception via a satellite receiver dish 306. Additional direct local feeds 308 receive direct transmission via a wireline link to local television stations. Also, additional local off-air reception via antennas 310 may also receive local programming that is not otherwise received through the direct local feeds 308.

These programming sources provide received programming to a content reception and processing system 304. This system 304 takes the various channels of television programming being received and creates a channel line-up. The content reception and processing system 304 receives a particular stream of programming and assigns it to a particular channel within the channel line-up.

The content reception and processing system 304 provides the individual streams of programming to a video broadcast system 312. The video broadcast system 312 then broadcasts each of the streams of programming within its assigned channel of the channel line-up. The video broadcast system 312 broadcasts these channels, as well as data such as guide data, to a switch 316 at the central location 302. This switch 316 then switches between the various sources of programming to provide a particular stream of programming through the distribution network 324 to viewer premises 326 according to a selection by a viewer.

In addition to receiving the broadcasted channel line-up from the video broadcast system 312, the switch 316 may receive television programming content from various other sources as well. For example, the switch 316 may receive content from a content storage and origination system 314. The content storage and origination system 314 may provide video-on-demand programming such as movies and other programming that viewers may want to watch at any given time such that content is stored and can be selected for playback to the viewer at any time the viewer requests. Such video-on-demand services are often provided on a fee per use basis or monthly fee basis. The switch 316 may also receive content through the Internet 322 from other programming sources and may provide television programming as well as data services to the end viewer through the distribution network 324.

A video control system 318 is included at the central location 302 to provide additional intelligence for operation of the switch 316. The switch 316 receives user commands for the changing from one stream to send to the viewer appliance 328 to another. The switch 316 may select one stream or another, such as those streams from the video broadcast system 312, without further assistance. However, certain channels of the video broadcast system 312 or content from the content and storage origination system 314 may be controlled on an account basis. The video control system 318 verifies that a particular viewer requesting a given channel or content has authorization to receive that channel or content and controls the switch 316 to either provide the channel/content or not provide the channel/content.

The streams being provided to viewer premises 326 may be either in an analog or a digital format. The network 324 may carry either format or both formats, such as where one set of channels of the channel line-up being received by the switch 316 are broadcast as analog while another set of channels of the channel line-up are digital. Additionally, the network 324 carries two-way communications such that communications are provided back to the switch 316 of the central location 302 from viewer premises 326 such that the switch 316 can select the particular stream to provide back through the network 324 to viewer premises 326.

At viewer premises 326, the incoming stream of channels is provided to the viewer appliance 328. The viewer appliance 328 allows a viewer to provide commands to control aspects of the television programming being viewed on a television 330, such as channel changes and/or additional aspects such as audio format and volume control.

When a viewer is watching television, the viewer continues to provide user commands to control the aspects of television programming as desired. Again, the viewer may provide a user command by pressing buttons on a remote control 335 that provides a corresponding signal to the viewer appliance 328 and are received by a reception module 331. Alternatively, the viewer may provide a user command by pressing buttons located on the viewer appliance 328 itself. The viewer appliance 328 of this example then performs at least one action. As the command is received, the viewer appliance 328 forwards the user command (i.e., a control message) back to the switch 316 at the central location 302 through a transfer module 329 rather than merely storing a record of it for future transfer. Where the command is a change to a new stream of programming, then the switch 316 and video control system 318 executes the command to begin providing a different stream, rather than the viewer appliance 328 executing the change. Where the user command is other than a channel change, such as a selection of audio format or volume, then the viewer appliance 328 also executes the command through a control module 333.

Upon the user command being received at the switch 316, it may be captured by the video control system 318 or the switch 316 from the stream of information being received from the network 324. An MKIS 320 is interfaced to the switch 316 and video control system 318 such that the user command is then passed to the MKIS 320 where it is stored in storage 321 in association with the contextual information that has been matched with the user command at the video control system 318, such as the identifier of the viewer who generated the command, the time at which the viewer appliance 328, switch 316, or video control system 318 received the user command, etc. Additionally, the video control system 318 may also match the user command being forwarded to the MKIS 320 with a result of the user command or may only forward the result. For example, the user command may be a channel up button, whose result is a change from channel 2 to channel 3 such that the video control system 318 forwards an "on channel 3" result to the MKIS 320 for storage.

The viewer appliance 328 may also forward the user command to an external location in other ways. For example, in systems where the MKIS 320 is not interfaced to the switch 316 and/or video control system 318, the MKIS 320 may be accessed through an alternative network such as described above in relation to FIG. 1. The viewer appliance 328 may be provided a connection to an alternative data network which interconnects an MKIS 320 to the viewer appliance 328. Like in the example of FIG. 1, the viewer appliance 328 may be connected to a digital subscriber line ("DSL") or other broadband connection, PSTN, wireless, etc. When the viewer appliance 328 receives the user command, it is forwarded back through the network 324 for execution while it is simultaneously forwarded through the alternative network to the MKIS 320 where it is captured from the stream of communication and is stored as described above.

Figure 4:
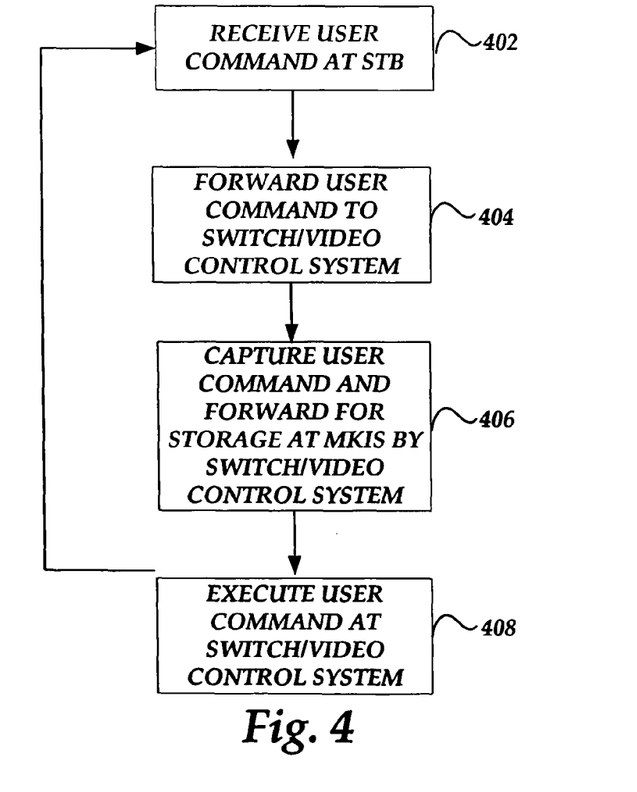
FIG. 4 shows an illustrative set of logical operations within the system of FIG. 3 for implementing embodiments of the present invention.

FIG. 4 shows an example of the logical operations that may be performed within the system of FIG. 3. The viewer appliance 328 receives the user command at reception operation 402. As the user command is received, the viewer appliance 328 then forwards the user command to the switch 316 or video control system 318 at forward operation 404. The switch 316 or video control system 318 then captures the user command for the information being returned through the network 324 and forwards the user command to the MKIS 320 for storage as described above at capture operation 406. As an alternative, rather than the switch 316 and video control system 318 forwarding the user command to the MKIS 320, the viewer appliance 328 may forward the user command to the MKIS 320 through an alternative network connection where it is then captured and stored. Also upon the switch 316 and/or video control system 318 receiving the user command, the user command is executed to alter the stream of programming being provided through the network 324 to viewer premises 326 at execution operation 408. Where the user command is not for a change in the stream in programming but is another change, such as a volume change, then the change may be implemented at viewer premises 326 rather than within the central location.

Thus, the embodiments of clickstream capture provide for the forwarding of the user command from the viewer appliance 328 to an external location as the commands are being received. This eliminates the requirement that the viewer appliance 328 record the user commands. However, the viewer appliance 328 may continue to perform clickstream capture as well to provide redundancy or for other purposes. As an advantage of performing clickstream capture at an external location, the external location typically has much greater capacity than an individual viewer appliance such that rather than filtering the user commands to be stored to eliminate those that are not as useful at understanding viewer behavior, the viewer appliance may forward all user commands so that the external location can capture and store all of the commands rather than selected ones.

The data that has been stored in the MKIS of the embodiments discussed above may then be used for various purposes. It may be used to target advertising for particular times and television programs. It may also be used to determine the proper characteristics for advertisements such as length and content. Furthermore, the data may be used to determine the proper television programming to provide at any given time. Accordingly, the data that is obtained has significant value in relation to making determinations about what content is provided for television viewers. Usage of this data for such purposes is discussed in more detail in U.S. application Ser. No. 09/467,889, filed on Dec. 21, 1999, and entitled METHOD AND SYSTEM FOR PROVIDING TARGETED ADVERTISEMENTS.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method, comprising:
receiving content from a distribution network;
receiving a command at a viewer appliance;
establishing communication from the viewer appliance to a remotely located component; when the command is a channel change at the viewer appliance, then immediately upon receipt concurrently forwarding the command from the viewer appliance to the remotely located component for demographic profiling;
when the command is not the channel change, then performing in parallel:
immediately upon receipt concurrently forwarding the command from the viewer appliance to the remotely located component for the demographic profiling; and
executing the command to alter an aspect of the content being viewed by the viewer; and
sending an indication that the command has been executed, whereby local storage of the command at the viewer appliance is eliminated;
sending a request from the viewer appliance for an advertisement in an advertisement insertion slot;
receiving an indication of the advertisement selected based on the demographic profiling; and causing the advertisement to be displayed in the advertisement insertion slot.

2. The method of claim 1, further comprising presenting the content at the viewer appliance.

3. The method of claim 1, further comprising matching the command to a present context.

4. The method of claim 3, further comprising concurrently forwarding the matching to the remotely located component.

5. The method of claim 3, further comprising determining a result of the command and concurrently forwarding the result to the remotely located component.

6. The method of claim 1, wherein the viewer appliance comprises a set-top box.

7. The method of claim 1, further comprising generating targeted advertising.

8. A method of capturing commands from a viewer that are related to viewing content, comprising:
receiving the content at a viewer appliance;
establishing communication from the viewer appliance to a remotely located component;
receiving a command at the viewer appliance;
when the command is a channel change, then immediately upon receipt concurrently forwarding the command from the viewer appliance to the remotely located component for demographic profiling remote execution to a new stream of programming;
when the command is not the channel change, then performing in parallel:
immediately upon receipt concurrently forwarding the command from the viewer appliance to the remotely located component for the demographic profiling;
executing the command to alter an aspect of the content being viewed by the viewer; and
sending an indication that the command has been executed at the viewer appliance, whereby local storage of the command at the viewer appliance is eliminated;
sending a request from the viewer appliance for an advertisement in an advertisement insertion slot;
receiving an indication of the advertisement selected based on the demographic profiling;
and causing the advertisement to be displayed in the advertisement insertion slot.

9. The method of claim 8, further comprising selecting a volume.

10. The method of claim 8, further comprising establishing a broadband connection from the viewer appliance to the remotely located component.

11. The method of claim 10, further comprising matching the command to a present context.

12. The method of claim 11, further comprising matching the command to a current time when the command is received.

13. The method of claim 10, further comprising determining a result of the command.

14. The method of claim 13, further comprising determining an audio format.

15. The method of claim 8, wherein receiving the command at the viewer appliance comprises receiving the command at a set-top box.

16. The method of claim 8, further comprising choosing the content based upon the command.

17. A system, comprising:
a processor; and
memory storing instructions that when executed cause the processor to perform operations, the operations comprising:
receiving the content from a distribution network;
establishing communication with a remotely located component;
receiving a command entered during presentation of the content;
concurrently forwarding the command immediately upon receipt to the remotely located component for demographic profiling in response to the command being a channel change;
performing in parallel in response to determining the command is not the channel change:
concurrently forwarding the command immediately upon receipt to the remotely located component for the demographic profiling; and executing the command to alter an aspect of the content during the presentation; and sending an indication that the command has been executed, whereby local storage of the command in the memory is eliminated;

sending a request for an advertisement in an advertisement insertion slot;

receiving an indication of the advertisement selected based on the demographic profiling;

and causing the advertisement to be displayed in the advertisement insertion slot.

18. The system of claim 17, wherein the operations further comprise determining a result of the command.

19. The system of claim 17, wherein the operations further comprise storing a result of the command.

20. A method of capturing commands from a viewer that are related to viewing content, comprising:

receiving the content from a distribution network at a viewer appliance;

establishing communication from the viewer appliance to a remotely located component;

receiving a command at the viewer appliance entered by the a viewer;

concurrently forwarding the command immediately upon receipt to the remotely located component for demographic profiling in response to determining the command is a channel change; performing in parallel in response to determining the command is not the channel change:

immediately upon receipt concurrently forwarding the command from the viewer appliance to the remotely located component for the demographic profiling; and executing the command; and sending an indication that the command has been executed, whereby local storage of the command at the viewer appliance is eliminated;

sending a request for an advertisement in an advertisement insertion slot;

receiving an indication of the advertisement selected based on the demographic profiling;

and causing the advertisement to be displayed in the advertisement insertion slot.

21. The method of claim 20, further comprising matching the command to a present context.

22. The method of claim 21, further comprising determining a result of the command.

23. The method of claim 20, further comprising targeting the advertisement to the command.

* * * * *